United States Patent
Baitule et al.

(10) Patent No.: US 10,481,801 B1
(45) Date of Patent: Nov. 19, 2019

(54) OPTIMIZING STORAGE QUALITY OF SERVICE (SQOS) BY DYNAMICALLY DETERMINING AND MANAGING OPTIMAL QUEUE DEPTH AND SYSTEM CAPACITY

(71) Applicant: Veritas Technologies LLC, Mountain View, CA (US)

(72) Inventors: Shreenivas N. Baitule, Pune (IN); Sudhakar Paulzagade, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 15/902,670

(22) Filed: Feb. 22, 2018

(51) Int. Cl.
   *G06F 3/06* (2006.01)
   *G06F 9/455* (2018.01)

(52) U.S. Cl.
   CPC ............ *G06F 3/061* (2013.01); *G06F 3/0604* (2013.01); *G06F 9/45558* (2013.01); *G06F 3/067* (2013.01)

(58) Field of Classification Search
   CPC combination set(s) only.
   See application file for complete search history.

(56) References Cited

U.S. PATENT DOCUMENTS

| 5,166,930 | A * | 11/1992 | Braff | H04L 12/56 370/235 |
| 6,456,590 | B1 * | 9/2002 | Ren | H04L 47/10 370/229 |
| 6,717,945 | B1 * | 4/2004 | Jue | H04L 12/5601 370/392 |
| 6,975,638 | B1 * | 12/2005 | Chen | H04L 47/215 370/232 |

\* cited by examiner

*Primary Examiner* — Raymond N Phan
(74) *Attorney, Agent, or Firm* — Campbell Stephenson LLP

(57) ABSTRACT

Various systems and methods are provided for optimizing Storage Quality of Service (SQoS) by dynamically determining and managing queue depth and system capacity in a computer storage system. In one embodiment, this functionality includes determining a queue depth value for a given epoch, and then advertising that queue depth value to one or more applications. Upon receiving a number of I/O operations that does not exceed the advertised queue depth, the storage tier processes those I/O operations. The system then evaluates the system capacity in light of the current queue depth value and other variables, such as the observed (or "seen") latency, to determine whether the optimal queue depth value has been reached. Until the optimal queue depth value has been reached, the process outlined above is repeatedly iteratively (with dynamically increasing queue depth values) in each ensuing epoch until the optimal queue depth value is determined.

17 Claims, 7 Drawing Sheets

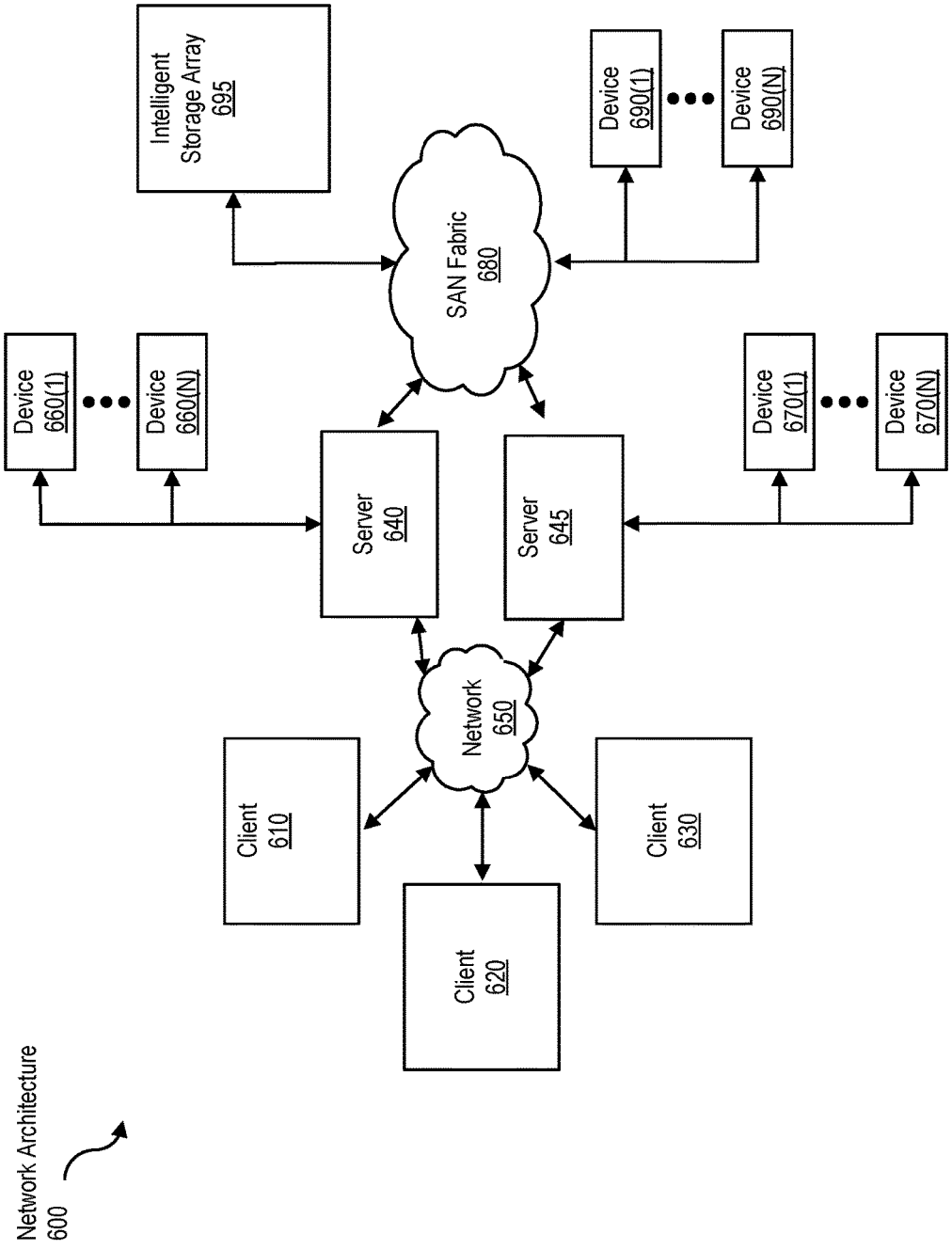

US 10,481,801 B1

OPTIMIZING STORAGE QUALITY OF SERVICE (SQOS) BY DYNAMICALLY DETERMINING AND MANAGING OPTIMAL QUEUE DEPTH AND SYSTEM CAPACITY

BACKGROUND OF THE INVENTION

Field of Endeavor

This disclosure generally relates to storage quality of service, and more particularly to optimizing Storage Quality of Service by dynamically determining and managing queue depth and system capacity.

State of the Technology

Due to the increased availability of relatively cheap storage memory, storage quality of service (SQoS) has become a bigger issue than storage capacity in modern computer storage systems. SQoS includes functionality designed to increase the speed and efficiency of reading and writing I/O operations to and from storage, among other potential uses.

SUMMARY OF THE DISCLOSURE

The disclosure generally includes methods, computer program products, computer systems, and the like, that provide for optimizing Storage Quality of Service (SQoS) by dynamically determining and managing queue depth and system capacity in a computer storage system. In one embodiment, the functionality disclosed herein includes determining a queue depth value for a given epoch, or time period, and then advertising that queue depth value to one or more applications. Upon receiving a number of I/O operations that does not exceed the advertised queue depth, the storage tier processes (or at least attempts to process) those I/O operations. After processing (or attempting to process) the received I/O operations, the system then evaluates the system capacity in light of the current queue depth value and other variables, such as the observed (or "seen") latency. The system then determines whether the optimal queue depth value has been reached. Until the optimal queue depth value has been reached, the process outlined above is repeatedly iteratively (with dynamically increasing queue depth values) in each ensuing epoch until the optimal queue depth value is determined. Once the optimal queue depth value has been determined, the system then takes steps to manage congestion in ensuing epochs. The foregoing functionality is performed dynamically at run time.

The foregoing is a summary and thus contains, by necessity, simplifications, generalizations and omissions of detail, consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The embodiments of the present application may be better understood, and its numerous objects, features, and advantages made apparent to those skilled in the art by referencing the accompanying drawings.

FIG. 6 is a block diagram of a networked system, illustrating how various computing devices can communicate via a network, according to one embodiment of the present disclosure.

Figure 1A:
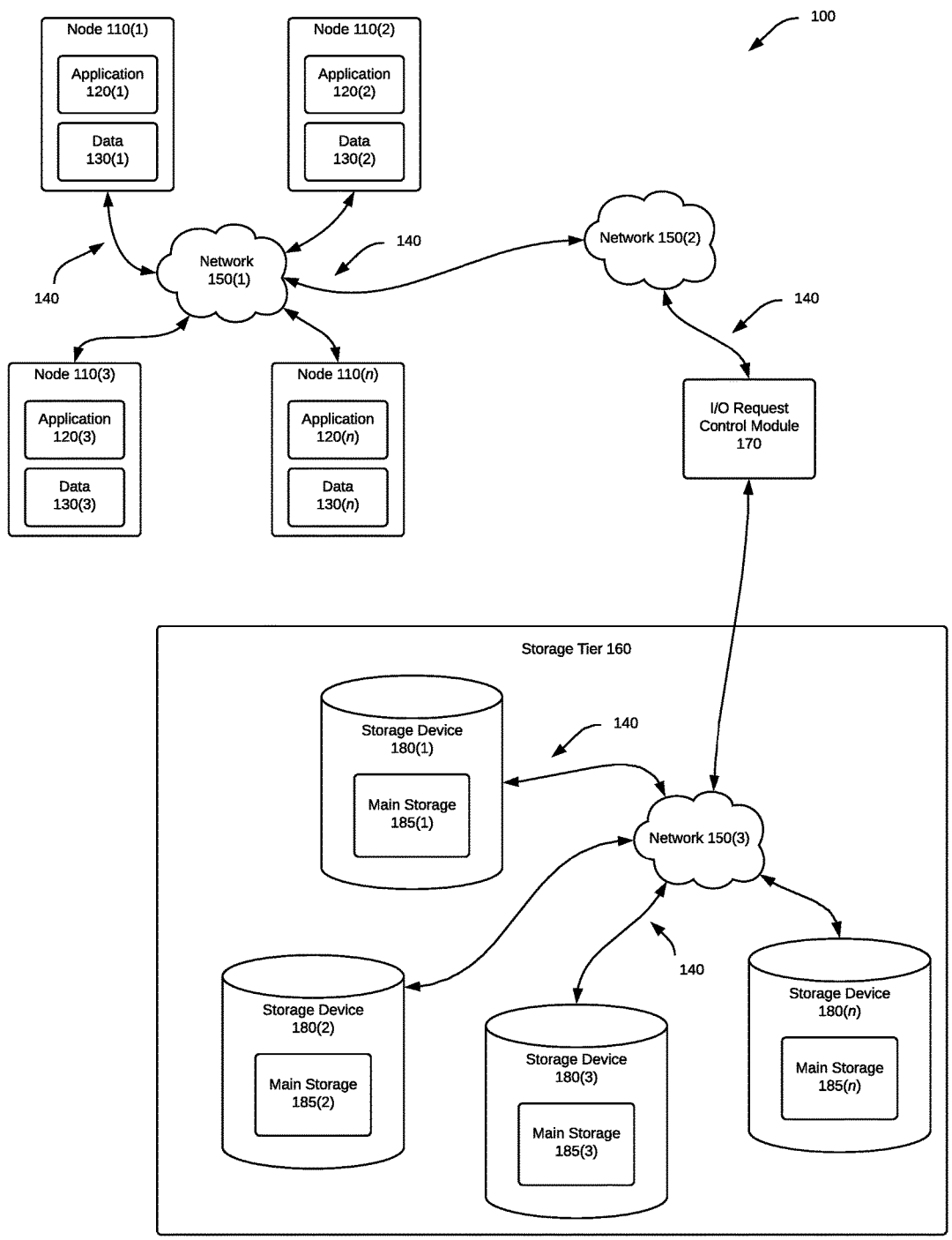
FIG. 1A is a block diagram depicting an example computing environment, according to one embodiment of this disclosure.

While the embodiments of the present disclosure are susceptible to various modifications and alternative forms, specific embodiments are provided as examples in the drawings and detailed description. It should be understood that the drawings and detailed description are not intended to limit the embodiments to the particular form disclosed. Instead, the disclosure is intended to cover all modifications, equivalents and alternatives falling within the spirit and scope of the disclosure as defined by the appended claims.

DETAILED DESCRIPTION

Maintaining an efficient Storage Quality of Service ("SQoS") requires managing congestion in a storage system. When a storage system becomes congested, performance generally decreases, which results in a reduced, and less predictable, SQoS. In many current storage systems, SQoS functionality uses a measurement of queue depth to avoid congestion at the storage level. More specifically, SQoS systems combine queue depth measurements with various latency readings to predict system capacity for a coming epoch, or time period.

To achieve this functionality, current SQoS systems use values that are hardcoded in configuration files. However, the use of such hardcoded values creates additional problems. For instance, this approach does not work well (and sometimes, does not work at all) for systems where latencies vary significantly from one storage device to the next. Moreover, this approach becomes problematic when devices are upgraded or improved, or when the SQoS is being integrated with a system for which the expected latencies are either not well known, or where the expected latencies vary from the latencies of the systems for which the configuration files were originally configured.

This disclosure provides methods, computer program products, computer systems, and the like, that provide for optimizing SQoS by dynamically determining and managing queue depth and system capacity in a computer storage system. Storage systems are concerned about the number of I/O operations that can be performed per second, which is known as I/O Operations per Second, or "IOPS." IOPS is a measurement of the number of read or write operations (e.g., I/O operations) that can be performed in one second in a given storage system. (Although the word "second" is part of the name of this measurement, in practice IOPS may pertain to a time period other than one second.) The total number of IOPS that are available for any epoch is distributed among the workloads (e.g., the workloads of the various applications, such as, e.g., applications 120, and of other systems) that are connected to the storage tier. In certain embodiments, the available IOPS are distributed to one or more applications (such as, e.g., applications 120) and systems based on a service level agreement (SLA) and/or the current demand associated with each application or system. Efficiently managing the system capacity in this manner is important with respect to SQoS functionality, as well as for business practices related to the sale and management of storage space and performance within a storage system. Further details will be provided below in conjunction with the discussion of the various figures included herewith.

FIG. 1A shows an example computing environment 100 that includes one or more compute nodes, such as nodes 110(1)-12(n) (collectively, "node 110"). In one embodiment, nodes 110 are organized as a cloud computing environment. In other embodiments, nodes 110 can be organized and connected in different manners. Regardless of the specific organizational structure of the nodes, each of these nodes can be any computing device, such as a personal computer, laptop computer, notebook computer, personal computing device (e.g., a cell phone), a server, or any other personal computing device. Moreover, as used throughout this disclosure, the letter n is used to indicate a variable number of devices or components. Although the letter n is used in describing a variable number of instances of each of these different devices and components, a repeated use of the letter n does not necessarily indicate that each device and component has a same number of n instances implemented in the example system discussed herein, or in any other embodiment of this invention.

Each node 110 can be configured to execute one or more applications, such as applications 120(1)-120(n) (collectively, "applications 120"). In alternate system configurations, applications 120 can also collectively be referred to as an application layer. Each application 120 can be any sort of computer program, including, e.g., a virtual machine or any other computer application. Each node 110 can also be configured to store data, such as data 130(1)-130(n) (collectively, "data 130"). Although FIG. 1A only depicts only example application 120 and one example unit of data 130 for each node 110, in practice each node 110 can, and generally will, be configured to execute multiple applications 120 and store multiple units of data 130 at any given time. Each item of data 130 can be any sort of computer data, such as any sort of file (e.g., a word processing document, an image, a movie, a song, and so forth), folder, directory, program, script, and so forth. In addition, although not expressly depicted in FIG. 1A, each node 110 can include other information and functionality as is used in the operation of a computing device.

As can be seen from FIG. 1A, each node 110 is connected via a connection 140(1)-140(n) (collectively, "connections 140") to a first network 150(1) among a plurality of networks 150(1)-(3) (collectively, "network 150"). (The reader will appreciate that, for the sake of space, only certain of the connections are specifically labeled with the number 140.) Each of the connections 140 can be any sort of wired and/or wireless network connection, such as an Ethernet connection, a Fiber Optic connection, a BLUETOOTH connection, and so forth, including various combinations of the foregoing technologies. Each network 150 can be any sort of network, including a local area network ("LAN"), wide area network ("WAN"), storage area network ("SAN"), the Internet, an intranet, and so forth. Although three instances of network 150 are depicted in FIG. 1A for the sake of explanation, in practice more or less instances of network 150 can be used.

Through the various connections and networks, each node 120 is ultimately connected to a storage tier, such as, e.g., storage tier 160. Storage tier 160 can be any type of storage network, such as, e.g., a cloud storage network, software defined storage ("SDS"), flash storage, direct attached storage ("DAS"), a storage area network ("SAN"), or other types of storage or storage networks. System 100 also includes a control module, such as, e.g., I/O request control module 170 (or "control module 170," for short), that is configured to control I/O requests to the storage tier. In various embodiments, control module can include functionality such as can be found in VERITAS HYPERSCALE and VERITAS VELOCITY products, in addition to other products and functionality. Although depicted in a certain location for the sake of illustration in FIG. 1A, in practice I/O request control module 170 can be located anywhere in system 100. In certain embodiments, I/O request control module 170 can include one or more modules (or other components) that may work together despite being located on distinct physical devices, stored in distinct locations in memory, or the like. The I/O request control module 170 will be discussed in more detail below.

Storage tier 160 also includes one or more storage devices, such as storage devices 180(1)-180(n) (collectively, "storage devices 180"). Each storage device 180 will generally include at least a main storage, such as main storage 185(1)-185(n) (collectively, "main storage 185"). Although FIG. 1A only depicts only main storage 185 for each storage device 180, in practice each storage device 180 can include more than one form of storage. Each main storage 185 can be any form of non-volatile, non-transient computer-readable storage medium, such as a hard disk drive (HDD), a solid state memory device (SSD), flash storage, or VME storage. In addition, although not expressly depicted in FIG. 1A, each storage device 180 can include other forms and/or instances of storage. In certain embodiments, each main storage 185 can be spread out among one or more distinct storage units that can work together to collectively store the relevant data. Moreover, as one who is skilled in the art would appreciate, each storage device 180 can include various other components and functionality as necessary for operation in conjunction with this disclosure.

Figure 1B:
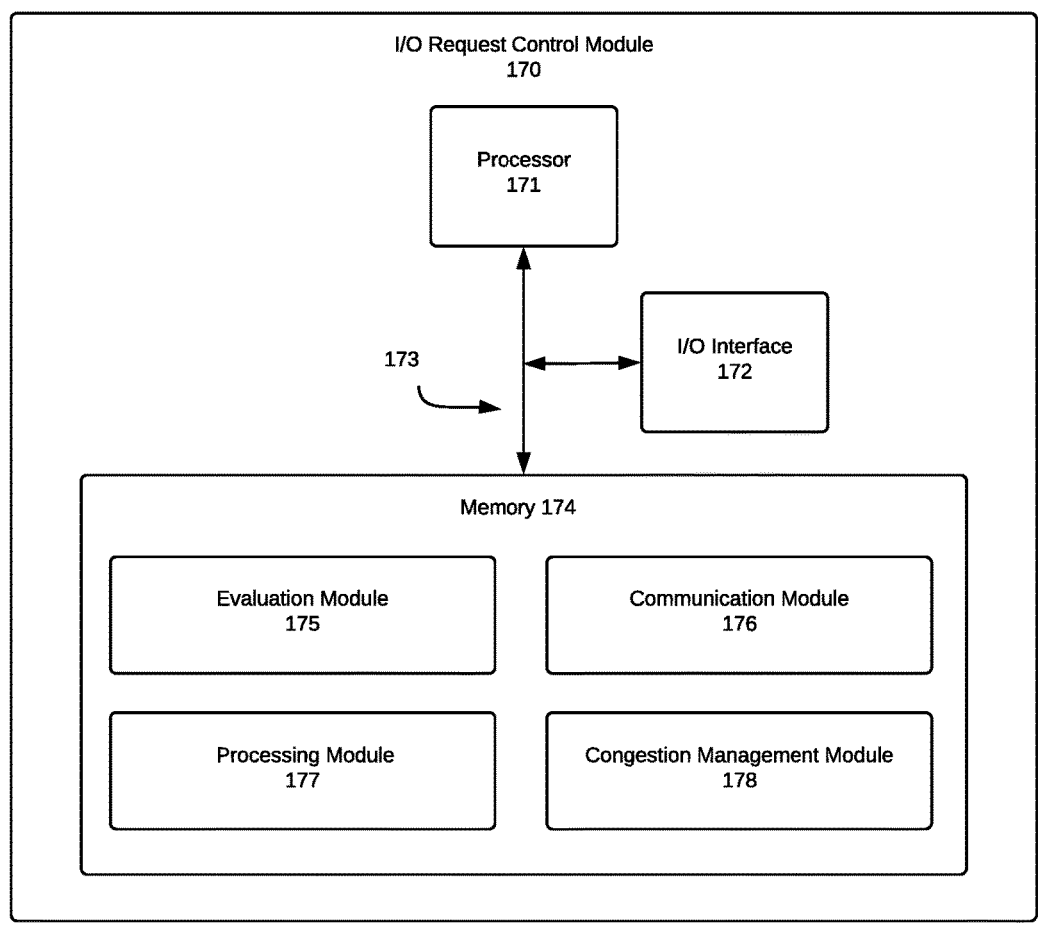
FIG. 1B is a block diagram that provides additional details of an I/O request control module, such as the example I/O request control module included in the example computing environment of FIG. 1A, according to one embodiment of this disclosure.

FIG. 1B provides enhanced details of I/O request control module 170 (or "control module 170," for short). For instance, FIG. 1B depicts various modules and submodules that can be used in conjunction with this disclosure. Modules, such as those depicted in FIG. 1B, can be any combination of software and/or hardware that are configured, or capable of being configured, to perform the functionality associated with each such model. Modules contain computer instructions (e.g., computer code or other instructions) that can be executed by a processor, such as processor 171, in conjunction with an I/O interface, such as I/O interface 172. As shown in FIG. 1B, processor 171 and I/O interface 172 are connected to certain other components of I/O request control module 170 via bus 173. In various embodiments, one or more modules are stored in a non-transient computer-readable storage medium, such as memory 174.

Examples of modules that may be included in I/O request control module 170 are depicted in FIG. 1B. For instance, FIG. 1B depicts an evaluation module 175, which can be configured to perform various actions that will be discussed below. For instance, in various embodiments, evaluation module 175 is configured to perform one or more steps shown in FIGS. 2 and 3, such as, e.g., steps 210, 250, 260, and 280, and one or more steps of method 300. FIG. 1B also depicts a communication module 176, which can be configured to perform one or more communication-related features of this disclosure. For instance, in various embodiments, communication module 176 is configured to perform one or more steps of method 200, such as, e.g., steps 220 and 230, as well as other functionality such as is described herein. Similarly, processing module 177 can be configured to perform one or more features related to processing I/O requests, such as, e.g., steps 240, as well as other functionality such as is described herein. Furthermore, FIG. 1B also depicts congestion management module 178. In certain embodiments, congestion management module can be configured to perform one or more actions related to congestion managements, such as, e.g., step 270 and one more steps of method 400, as well as other functionality such as is described herein.

Figure 2:
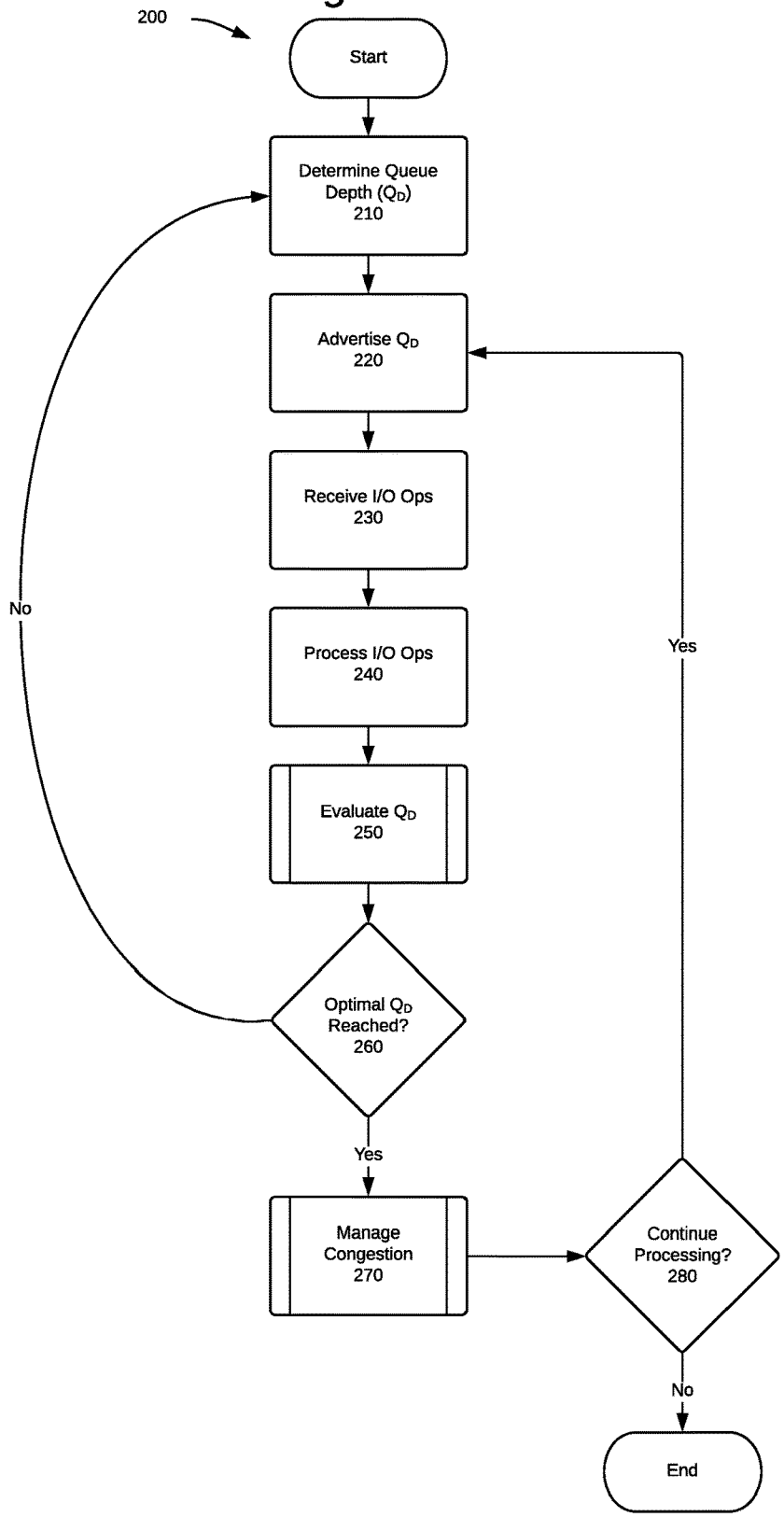
FIG. 2 is a flowchart depicting various actions that can be performed to determine an optimal queue depth for a storage system and to manage congestion related thereto, according to one embodiment of this disclosure.

FIG. 2 is a flowchart of a method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 200 is described with reference to elements such as those described in connection with FIGS. 1A and 1B. In one embodiment, method 200 is performed by a control module, such as, e.g., I/O request control module 170.

Method 200 begins at 210, where the queue depth ($Q_d$) is determined. In one embodiment, the queue depth is the maximum number of parallel I/O requests that can be queued to, or by, the storage tier. An I/O request can generally be any request to read or write data to the storage tier, i.e., any read or write request. When the number of I/O requests sent to the storage tier exceeds the maximum $Q_d$, latencies in the storage tier will generally increase (i.e., higher latencies will result) and throughput is generally adversely affected. Therefore, determining the optimal $Q_d$, and endeavoring not to exceed that optimal $Q_d$, are both of paramount importance for various storage systems (e.g., a storage tier, storage device, other storage system, and so forth) to function optimally and efficiently.

In the first pass through method 200, $Q_d$ is initially set to an initial value, which occurs at step 210. As will be discussed in additional detail below, this value will be modified with each successive iteration through 210. (This approach, which will be discussed in this paragraph and the following two paragraphs of this specification, will be referred to herein as the "primary" approach when being compared to the "alternative" approaches discussed below.) For the sake of this example, let us assume that $Q_d$ is set to an initial value of 1. In other embodiments, another initial $Q_d$ value can be used. In subsequent passes through 210 in each ensuing epoch in which this "primary" approach is used, the queue depth value for the next epoch ($Q_{d-next}$) is generally calculated by adding the queue depth value from the previous ($Q_{d-prev}$) to the current queue depth value ($Q_{d-curr}$). Thus, in the second pass through 210 using this "primary approach" and based on these example values, the value of $Q_{d-prev}$, would be 0 (since there was no previous queue depth value prior to the current/initial value), and the value of $Q_{d-curr}$ would be 1 (since that was the $Q_d$ value from the most recent epoch). Thus, adding those values together, $Q_{d-next}$ would again be 1, and would be treated as the new $Q_d$ value for the second pass through 210.

In the third pass through 210 using this "primary" approach, $Q_{d-next}$ will be treated as $Q_{d-curr}$ (since $Q_{d-next}$ was the current $Q_d$ value for the most resent epoch), and, following the same logic, $Q_{d-curr}$ will be treated as $Q_{d-prev}$. As such, in the third pass through 210 based on these example values, $Q_{d-prev}$ would be 1 and $Q_{d-curr}$ would also be 1. As such, $Q_{d-next}$ would now be 2, and would be treated as the new $Q_d$ value for the third pass through 210. Then, in the next pass through 210 using this "primary" approach and based on these example values, $Q_{d-prev}$ would be 1 and $Q_{d-curr}$ would also be 2. As such, $Q_{d-next}$ would now be 3, and would be treated as the new $Q_d$ value for the next pass through 210. In the following pass through 210 using this "primary" approach and based on these example values, $Q_{d-prev}$ would be 2 and $Q_{d-curr}$ would also be 3, resulting in a value of 5 for $Q_{d-next}$. Once again, the $Q_{d-next}$ value of 5 would be treated as the $Q_d$ for the ensuing pass through 210.

As long as this "primary" approach is being used, the $Q_d$ value will generally continue to be modified in the manner described herein until the optimal $Q_d$ value is found or until the method overshoots the optimal $Q_d$ value, at which point the system will change to one of the "alternative" approaches for 210 that are discussed below. As can be seen from the discussion provided above, when 1 is used as the initial $Q_d$ value, the series of $Q_d$ values under the "primary" approach will generally increase in the form of 1, 1, 2, 3, 5, 8, 13, 21, 34, 55, 89, 144, and so forth, until the optimal $Q_d$ value is reached for a given storage tier or storage device. If a different initial $Q_d$ value is used under this "primary" approach, the ensuing sequence of numbers would change accordingly as well, although still according to the general pattern of $Q_{d-next}=Q_{d-prev}+Q_{d-curr}$, where $Q_{d-next}$ will effectively become the $Q_d$ value for the ensuing pass through 210. Once the optimal $Q_d$ value is reached for a given storage tier or storage device, the system will take steps to maintain system congestion and will adjust $Q_d$ accordingly as needed. Functionality related to the maintenance of $Q_d$ (after the optimal $Q_d$ value is determined) will be discussed in more detail below, particularly in conjunction with 270 and the related discussion of FIG. 4 and method 400.

As noted above and as will be discussed in more detail in conjunction with FIG. 3 and method 300, below, the method used herein may eventually "overshoot" the optimal $Q_d$ value before determining the $Q_d$ value that is actually optimal. For instance, using the values provided above, the system may determine in one epoch that the $Q_d$ value of 89 was too low, and may then determine in the next epoch that the subsequent $Q_d$ value of 144 is too high. In this situation, the system will switch from using the "primary" approach discussed above to using an "alternative" approach to determine the next $Q_d$ value at 210. The use of an alternative approach becomes necessary at this point in order to "slow down" and/or "fine tune" the method until the optimal $Q_d$ value is determined. Although various alternative approaches are possible at this point, two possible alternative approaches are discussed below.

The first of these alternative approaches for 210 can be referred to as an "iterative" or "linear" approach. This approach involves reverting to the last $Q_d$ value that was not found to be too high (e.g., 89, continuing with the example given above), and then incrementing that value by one for each ensuing epoch (e.g., 90, 91, 92, and so forth) until the optimal $Q_d$ value is determined. This functionality would then be repeated in each ensuing epoch (e.g., each ensuing pass through 210) until the optimal $Q_d$ value is determined, which will again be discussed in more detail below. The calculation of the next $Q_d$ value under this approach can be expressed as $Q_{d-next}=Q_{d-prev}+1$.

The second of these alternative calculations for 210 can be referred to as "splitting the difference" between the last $Q_d$ value that was found to be too low, and the last $Q_d$ value that was found to be too high (and rounding as necessary, either up or down, to achieve a whole number value for the next $Q_d$ value). For instance, continuing with the example given above, the system may determine in one epoch that the $Q_d$ value of 89 was too low, and may then determine in the next epoch that the subsequent $Q_d$ value of 144 was too high. The difference between these two values is 55. Thus, in the next epoch, the system can "split the difference" by adding one-half of this difference to the previous $Q_d$ value (e.g., 89) in order to determine the next $Q_d$ value (and rounding to the nearest whole number as necessary, whether during the calculation or at the completion thereof). Thus, for instance, if a $Q_d$ value of 89 was too low and a $Q_d$ value of 144 was too high, the next $Q_d$ value can be calculated by adding one-half of the difference between these values to the value that was found to be too low, e.g., $Q_{d-next}=89+((144-89)/2)=89+(55/2)=89+27.5=116.5$, which would be rounded to 117 (or, alternatively, rounded to 116). Then in the next epoch, if the $Q_d$ value of 117 is found to still be too low, the next $Q_d$ value would be calculated by once again splitting the difference between the most recent $Q_d$ value that was too low (e.g. 117) and the most recent $Q_d$ value that was too high (e.g., 144). Thus, continuing with the example above, if the $Q_d$ value of 117 was found to still be too low, the next $Q_d$ value would be calculated as $Q_{d-next}=117+((144-117)/2)=117+(27/2)=130.5$, which would be rounded to 131 (or alternately, rounded down to 130). If this $Q_d$ value is then found to be too high, for example, the next $Q_d$ value would be calculated by once again "splitting the difference" between the most recent $Q_d$ value that was too low (e.g. 117) and the most recent $Q_d$ value that was too high (e.g., 131). As such, the next $Q_d$ value would be calculated as $Q_{d-next}=117+((131-117)/2)=117+7=124$. (Alternately, the next $Q_d$ value could be calculated by subtracting half of the difference from the most recent $Q_d$ value that was found to be too high, e.g., $Q_{d-next}=131-((131-117)/2)=131-7=124$.) As such, the calculation of the next $Q_d$ value under this approach can be expressed as $Q_{d-next}=Q_{d-low}+((Q_{d-high}-Q_{d-low})/2)$ or, alternatively, as $Q_{d-next}=Q_{d-high}((Q_{d-high}-Q_{d-low})/2)$.

Although a system can use either of these alternative approaches, among other potential alternative approaches, in practice a system will typically be configured to use only one of these approaches when an alternative approach becomes necessary (e.g., when the system overshoots the optimal $Q_d$ value). Regardless of which alternative approach the system is configured to use, that alternative approach will replace the original approach (e.g., $Q_{d-next}=Q_{d-prev}+Q_{d-curr}$) for all ensuing passes through 210 starting with the first epoch after the method first overshoots the optimal $Q_d$ value. As noted above, the use of an alternative approach becomes necessary at this point in order to "slow down" and/or "fine tune" the method until the optimal $Q_d$ value is determined.

Regardless of whether the original or alternative approach is used in any given pass through 210, once the $Q_d$ value is determined in 210, method 200 then moves on to 220. Thus, after the current $Q_d$ value is set in step 210, the $Q_d$ value will be advertised in 220. For instance, this $Q_d$ value can be advertised to one or more applications (such as, e.g., applications 120) and/or a different "layer" of a storage system that is configured to send I/O requests to the storage tier. In one embodiment, a device or module may perform the advertising, such as I/O request control module 170. By advertising the $Q_d$ value, the system provides information to one or more of applications 120 and/or a different layer indicating how many I/O requests can be processed in the next epoch (i.e., period) of time. Generally speaking, an epoch can be any unit of time, although an epoch is commonly taken to be 1 second. In other embodiments, however, an epoch (or unit) of time can be two seconds, one millisecond, or any other unit of time.

In 230, the system generally receives a number n of I/O requests from one or more of applications 120 and/or another layer of the storage system. In other instances, however, the number n of I/O requests received at 230 can be less than $Q_d$ if n is less than $Q_d$ for any given epoch, such as, e.g., during a period of reduced activity among one or more of applications 120. However, the number n of I/O requests received at 230 should never be more than the $Q_d$ value that was advertised in 220.

At 240, the system processes as many I/O requests as the system is capable of processing in the given epoch. In some instances, this number may be limited by the number of I/O requests that were received in 230. For instance, in the first pass through this method, where $Q_d$ is equal to 1, the system would only receive one I/O operation at 230. Thus, the system can only process one I/O operation in the ensuing instance of 240, since that is the total amount of I/O requests that were received in 230. This processing limitation is true during that epoch, even though the system would have been able to process more I/O requests if more I/O requests had been received in 230. In some instances, such as those that will be discussed in more detail below, the number of I/O requests processed in any given epoch may be limited by a change in system capacity respective to a given epoch, which could occur for various reasons.

At 250, the system evaluates $Q_d$ in light of the various actions and operations that were performed during the current (or most recent) epoch as a result of steps 210 through 240. This evaluation step will be discussed in more detail in conjunction with FIG. 3 and method 300 below, which collectively provide additional detail regarding 250. However, for the sake of advancing the instant discussion, step 250 can briefly be described as determining whether the current $Q_d$ value is the ideal queue depth for the system.

If step 250 (and method 300) determines that the optimal $Q_d$ value has not yet been reached (e.g., such as in 350), then step 260 will evaluate in the negative, and method 200 will return to 210. At this point, the $Q_d$ value will be incremented in conjunction with the "primary" approach discussed above in conjunction with 210. (However, once method 300 indicates that the system should switch to the "alternative" approach, the alternative approach will then be used for all subsequent passes through 210, until the optimal $Q_d$ value is determined.) For instance, in passes through method 200 in which the "primary" approach discussed above is being used, if the initial $Q_d$ value was set to 1, then the $Q_d$ value would increment in each successive epoch according to the pattern of 1, 1, 2, 3, 5, 8, 13, 21, 34, 55, 89, 144, and so forth, until the optimal value of $Q_d$ is reached, or until the method overshoots the optimal value of $Q_d$. In other embodiments, a different starting value of $Q_d$ can be used, even under the primary approach. For instance, if the initial starting value of $Q_d$ was 2, then the $Q_d$ value would increment in each successive epoch according to the pattern of 2, 2, 4, 6, 10, 16, 26, 42, 68, 110, 178, and so forth, until the optimal value of $Q_d$ is reached, or until the method overshoots the optimal value of $Q_d$.

If step 250 (and method 300) determines that the optimal $Q_d$ value has not yet been determined, and method 300 also indicates that method 200 should switch to an alternative approach for determining the $Q_d$ value (e.g., such as in 370), then method 200 will return to 210 but will replace the primary approach with one of the alternative approaches discussed above. This situation will generally occur when method 200 "overshoots" the optimal $Q_d$ value for the first time. As noted above, and as also discussed below, method 300 will indicate that method 200 should switch to an alternative approach in the first instance where method 300 determines that method 200 "overshot" the optimal queue depth value $Q_d$. Once method 300 indicates that an alternative approach should be used, that alternative approach will be used for all ensuing passes through 210 until the optimal $Q_d$ value is determined, or until method 200 ultimately ends (e.g., when that given computing device is powered down or otherwise taken off line).

In passes through 210 in which one of the "alternative" approaches (e.g., the linear/iterative approach, or the splitting the difference approach) is being used, that alternative approach would be used in lieu of the "primary" approach discussed above. Additional details regarding each of these approaches are provided above, in conjunction with the discussion of 210. Although method 300 can indicate which of the alternative approaches should be used, that will generally not be the case. Rather, in the primary embodiment of methods 200 and 300, the system will be configured to use one and only one of the alternative approaches discussed above, and that alternative will thus be treated as the alternative approach that is used when method 300 indicates that method 200 should switch to the alternative approach.

If step 250 (and method 300) determines that the $Q_d$ value has been reached (e.g., such as in 380), then step 260 will evaluate in the positive, and method 200 will proceed to 270. At 270, the system will manage congestion in the storage tier. This functionality will be discussed in more detail in conjunction with FIG. 4 and method 400 below, which collectively provide additional detail regarding 270. Upon completing the functionality of 270 (and method 400), method 200 will then proceed to 280 to determine whether to continue processing in accordance with method 200. In the typical case where 280 evaluates in the positive, method 200 returns to 220 and advertises the current $Q_d$, the value of which will have been calculated during 270 (and method 400), which again will be discussed in more detail below. If method 200 evaluates 280 in the negative, such as, e.g., if the system is being shut down for any reason, then method 200 will end.

Figure 3:
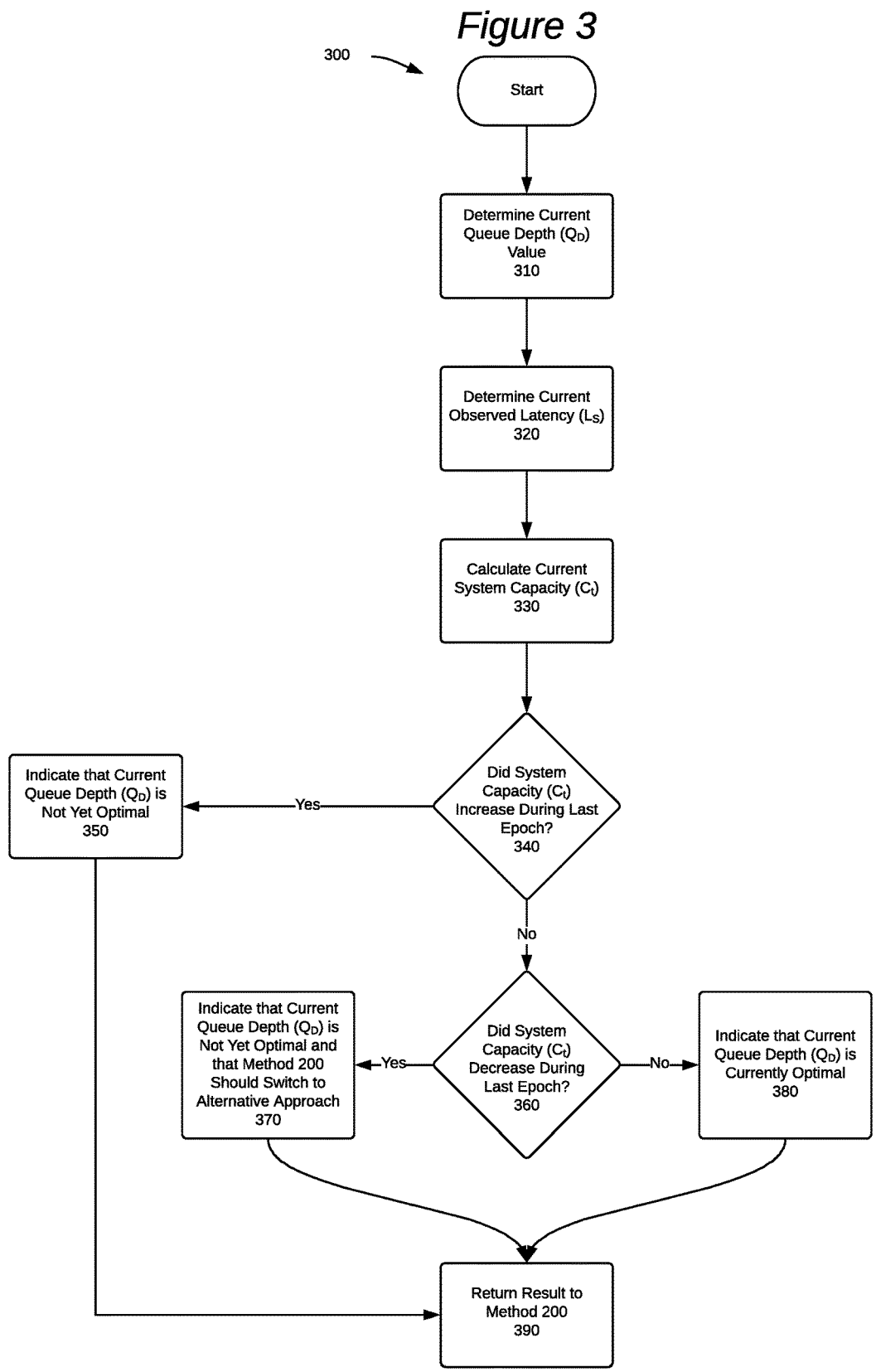
FIG. 3 is a flowchart depicting various actions that can be performed in conjunction with determining an optimal queue depth for a storage system, according to one embodiment of this disclosure.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 300 is described with reference to elements such as those described in connection with FIGS. 1A, 1B, and 2. In one embodiment, method 300 is performed by a control module, such as, e.g., I/O request control module 170. In other embodiments, method 300 is performed by one or more threads, daemons, processes, or other such constructs (collectively, "threads") that are distinct from I/O request control module 170.

Method 300 can be used to evaluate the current $Q_d$, such as in the case of performing 250. This evaluation of $Q_d$ is used to determine whether the optimal $Q_d$ value has been reached, with that information then being used in step 260 of method 200. To evaluate the current $Q_d$, method 300 begins by determining the current value of $Q_d$, which is shown in step 310. The current value of $Q_d$ can be determined by reading the value from a memory, such as a cache, flash memory, random access memory (RAM), or a hard disk drive, among other potential memories, among other ways of determining the current $Q_d$ value. In other instances, $Q_d$ can be a variable that is maintained with a computer program and which can therefore be "read" within a portion of the program (such as, e.g., within a method or algorithm) or "passed" from one portion of a program to another (such as, e.g., from one method to another method). Importantly, however, with the exception of the initial starting value of $Q_d$, $Q_d$ cannot be "hardcoded" in a program, in a file (e.g., a configuration file), or in any other memory location. Rather, $Q_d$ must be stored in a manner such that it can be dynamically changed from one pass through method 200 to the next pass through method 200, and that such dynamic changes can be performed without any direct human intervention. In other words, the value of $Q_d$ must be able to be dynamically iterated (or dynamically maintained, once the optimal $Q_d$ value has been determined) with each pass through method 200 (or any portions thereof), particularly with respect to each pass through 210, 250, 260, and 270.

In order to evaluate the current value of $Q_d$, method 300 also determines the current observed or "seen" latency ($L_S$) of the storage tier, which is shown in 320. Latency is the amount of time that each I/O request takes to complete, and is commonly measured in either milliseconds (ms) or microseconds (µs), although other measurement units are possible. The "seen" latency $L_S$ is the actual latency that was observed (or calculated) by the system during the most recent epoch, or time period (e.g., during the last second). For instance, in the first pass through method 200 (and keeping in mind that method 300 is essentially a more detailed view of step 250 of method 200), $Q_d$ will be set to some initial value (e.g., 1). However, the storage tier will almost certainly take much less than one full second to process a single I/O request. For instance, in one embodiment, the latency of the storage tier may be 5000p, or 0.005 seconds. This means that the storage tier would only take 5000 µs to process a single I/O request. In this example, method 300 would therefore determine that the seen latency $L_S$ of the storage system is 5000 µs for the current epoch (time period).

The seen latency $L_S$ is not necessarily affected by the $Q_d$ value, although $L_S$ certainly can be affected by the current $Q_d$ value (and also by the number of I/O requests received in any given epoch). For instance, $L_S$ will generally be adversely affected if the number of I/O requests received in any given epoch exceeds the optimal $Q_d$. (The optimal $Q_d$ will not necessarily be equal to the current $Q_d$, particularly in early passes through method 200.) Other factors may also affect the seen latency $L_S$, and may cause the seen latency $L_S$ to either increase or to decrease from one epoch to the next. For instance, performance may decrease, e.g., due to a decrease in the amount of available short-term memory (such as, e.g., RAM), or as a result of one or more memories becoming fragmented. Other factors, which are beyond the direct scope of this disclosure other than acknowledging their general potential existence, can also cause the seen latency $L_S$ to either increase or decrease from one time period to the next, which may result in the current $Q_d$ value being adjusted for the next epoch. (This functionality is discussed in more detail in conjunction with 270 and FIG. 4 and method 400.) Regardless of these factors, step 320 will be tasked with determining the current seen latency $L_S$ for the storage tier. Moreover, steps 310 and 320 can be performed in any order, and can also be performed simultaneously or substantially simultaneously to each other.

Once the current queue depth $Q_d$ and the current seen latency $L_S$ have both been determined, method 300 calculates the current system capacity $C_t$ in 330. In one embodiment, the current system capacity $C_t$ can be calculated by dividing the $Q_d$ by $L_S$, that is, $C_t = L_S$. This system capacity $C_t$ is measured in IOPS, or "I/O operations Per Second." Thus, $C_t$ is an indication of how many I/O operations the system could have performed in the current epoch; and thus, how many I/O operations the system can be expected to perform in the next epoch. For instance, during the first pass through method 200, and with an assumed $L_S$ of 5000 μs (0.005 seconds) and an initial $Q_d$ of 1, $C_t$ would evaluate to 1 I/O operation/0.005 seconds, or 200 IOPS. As another example, during a later epoch, $Q_d$ may have been increased to 34 I/O requests. Assuming that $L_S$ still remained at 5000 μs, $C_t$ would then evaluate to 34 I/O operations/0.005 seconds, or 6800 IOPS. As can be seen from the above, the system capacity will generally increase from one epoch to the next, so long as the seen latency remains the same. However, when the current $Q_d$ exceeds the number of I/O requests that can be processed in any given epoch, this will generally cause an increase in the seen latency for that epoch. As a result, the system capacity $C_t$ may decrease from one epoch to the next, even though the $Q_d$ value has increased. Additionally, when the optimal $Q_d$ value is determined, the system capacity $C_t$ may either remain the same from one epoch to the next, or may otherwise achieve a "local maxima" value, e.g., such as when viewed in relation to the next lower $Q_d$ value and the next higher $Q_d$ value.

As such, after the current system capacity $C_t$ is calculated, method 300 then determines in 340 whether the system capacity $C_t$ has increased or decreased since the previous epoch, and/or whether the maximal system capacity $C_t$ has been reached. If the system capacity $C_t$ has increased since the previous epoch, then 340 evaluates in the positive, and method 300 proceeds to 350. This result indicates that the maximum $C_t$ has not yet been reached, and as such, the current $Q_d$ value is not yet the optimal value of $Q_d$. As such, method 300 indicates that the current queue depth $Q_d$ value is not yet ideal. In one embodiment, this indication can be stored as a variable or as another form of information (e.g., data structure or data type) that can be passed back to method 200 at 390. Regardless of how the information is stored and passed, when the information is received at 260, method 200 would return to 210 and determine the next queue depth value $Q_d$ in accordance with the same approach (between the primary and alternative approaches) that was used in the previous epoch. That is to say, method 200 will generally continue to use the primary approach at this point, unless a previous pass through method 300 indicated that method 200 should switch to an alternative approach, at which point method 200 will continue to the alternative approach for all subsequent passes through 210, until the optimal $Q_d$ value is determined, or until method 200 ends. Regardless of which approach is used, the $Q_d$ value that is calculated at this point would then become the queue depth value $Q_d$ for the ensuing epoch. The previous queue depth value $Q_d$ is also retained (such as, e.g., in a temporary memory) as $Q_{d-prev}$, so that it can be used as needed, such as e.g., by 210 and/or method 400.

If the system capacity $C_t$ has not increased since the previous epoch, then 340 evaluates in the negative, and method 300 proceeds to 360. At 360, after having determined at 340 that the system capacity $C_t$ did not increase during the last epoch, method 300 now determines at this point whether the system capacity $C_t$ decreased during the last epoch. If method 300 determines at 360 that the system capacity $C_t$ did, in fact, decrease during the last epoch, this means that the system has "overshot" the optimal $Q_d$ value. As such, method 300 proceeds to 370, which indicates that the optimal $Q_d$ value has not yet been reached, and also that method 200 should switch to an alternative approach for determining the $Q_d$ value. In one embodiment, this indication can be stored as a variable or as another form of information (e.g., data structure or data type) that can be passed back to method 200 at 390. Regardless of how the information is stored and passed, when the information is received at 260, method 200 would return to 210 and determine the next queue depth value $Q_d$ in accordance with one of the "alternative" approaches discussed above. As noted above, although method 300 can indicate which of the alternative approaches should be used at this point, that will generally not be the case. Rather, in the primary embodiment of methods 200 and 300, the system will be configured to use one and only one of the alternative approaches discussed above, and that alternative will thus be treated as the alternative approach that is used when method 300 indicates that method 200 should switch to the alternative approach. Once method 300 first indicates that method 200 should switch to the alternative approach, the alternative approach will be used for all subsequent passes through 210 until the optimal $Q_d$ value is determined, or until method 200 ends.

If method 300 determines at 360 that the system capacity $C_t$ did not decrease during the last epoch, this means that the system capacity $C_t$ remained the same (since 340 already determined that the system capacity $C_t$ also did not increase during the last epoch). This result indicates that the maximum $C_t$ has been reached, and as such, the current $Q_d$ value is the optimal value of $Q_d$. As such, method 300 proceeds to 380, which indicates that the current queue depth $Q_d$ value is currently the optimal value of $Q_d$. In one embodiment, this indication can be stored as a variable or as another form of information (e.g., data structure or data type) that can be passed back to method 200 at 390. Regardless of how the information is stored and passed, when the information is received at 260, method 200 would proceed to 270, and manage congestion on the storage tier, which is discussed in more detail below in conjunction with FIG. 4 and method 400.

In one embodiment, the system also determines at 380 that the seen latency $L_S$ that is observed during the epoch in which the optimal queue depth value is reached should be treated as the congestion threshold latency ($L_W$). The congestion threshold latency ($L_W$) will be used in further operations related to congestion management, which is discussed in more detail below. In other embodiments, the system determines the congestion threshold latency ($L_W$) at a different time during the operation, such as, e.g., during the first epoch or another earlier epoch.

Finally, in step 390, method 300 will return the result (e.g., the "indication") of 350, 370, or 380 to method 200. In one embodiment, this result is passed as a Boolean value. In other embodiments, other methods of passing this information between software components (e.g., methods, algorithms, objects, modules, and so forth) can be used. In any event, method 300 terminates after performing 390, and control of the operations returns to method 200.

Figure 4:
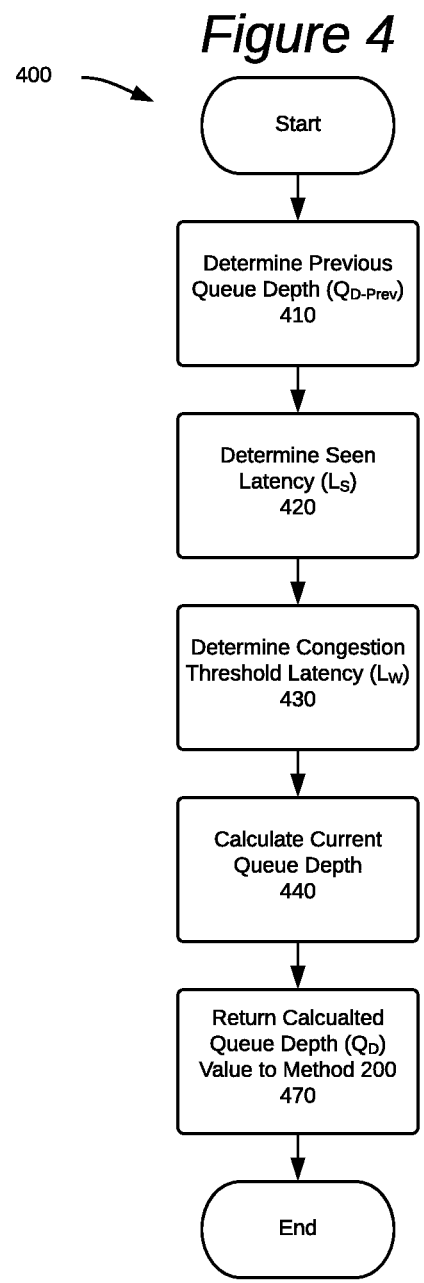
FIG. 4 is a flowchart depicting various actions that can be performed in conjunction with managing congestion in a storage system, according to one embodiment of this disclosure.

FIG. 4 is a flowchart of a method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 400 is described with reference to elements such as those described in connection with FIGS. 1A, 1B, and 2. In one embodiment, method 400 is performed by a control module, such as, e.g., I/O request control module 170. In other embodiments, method 400 is performed by one or more threads, daemons, processes, or other such constructs (collectively, "threads") that are distinct from I/O request control module 170.

Once the optimal queue depth value has been determined, method 400 can be used to manage congestion at the storage level, such as in the case of performing 270. To that end, method 400 begins by determining the previous value of $Q_d$ (i.e., the value of $Q_d$ from the last epoch), which is shown in step 310. As noted above, the previous queue depth value $Q_d$ is generally retained in a temporary memory (e.g., as the value of a variable) as $Q_{d\text{-}prev}$. As such, 310 can be performed by simply reading this value of $Q_{d\text{-}prev}$ from its location in memory. Method 400 also determines the seen latency $L_S$ at 420, and determines the congestion threshold latency $L_W$ at 430. The seen latency $L_S$ can be determined in the manner discussed elsewhere herein. As indicated above, the congestion threshold latency ($L_W$) value was previously set, such as, e.g., during the epoch when the optimal queue depth value $Q_d$ was determined. Thus, in one embodiment, the current "determining" step of 430 can be performed by reading that previously-determined congestion latency value ($L_W$) from a memory, such as, e.g., a cache, flash memory, a program variable stored in memory, or other location in memory. Steps 410, 420, and 430 can be performed in any order, and one or more of these steps can also be performed simultaneously or substantially simultaneously to one or more other of these steps.

Once the foregoing values have been determined, method 400 uses $Q_{d\text{-}prev}$, $L_W$, and $L_S$ to calculate the current queue depth $Q_{d\text{-}curr}$ in 440. In one embodiment, this calculation is performed using the formula $Q_d = (Q_{d\text{-}prev} + (Q_{d\text{-}prev} * (L_W/L_S))/2$. This formula will decrease the calculated queue depth $Q_d$ when the observed, or "seen," latency ($L_S$) increases. When the observed latency ($L_S$) decreases, the queue depth value $Q_d$ will increase. And if the observed latency $L_S$ does not change from one epoch to the next, then the queue depth value $Q_d$ will also not change between those two epochs. Through the use of this formula, and more broadly via step 270 and method 400, the system can manage any congestion that may occur in the storage tier by recalculating the optimal $Q_d$ value as appropriate. After calculating this value, the calculated value of $Q_d$ is returned to method 200 in step 450. This calculated value of $Q_d$ will then be used as the $Q_d$ value for the next pass through method 200. Method 400 terminates after performing 450, and control of the operations returns to method 200.

Figure 5:
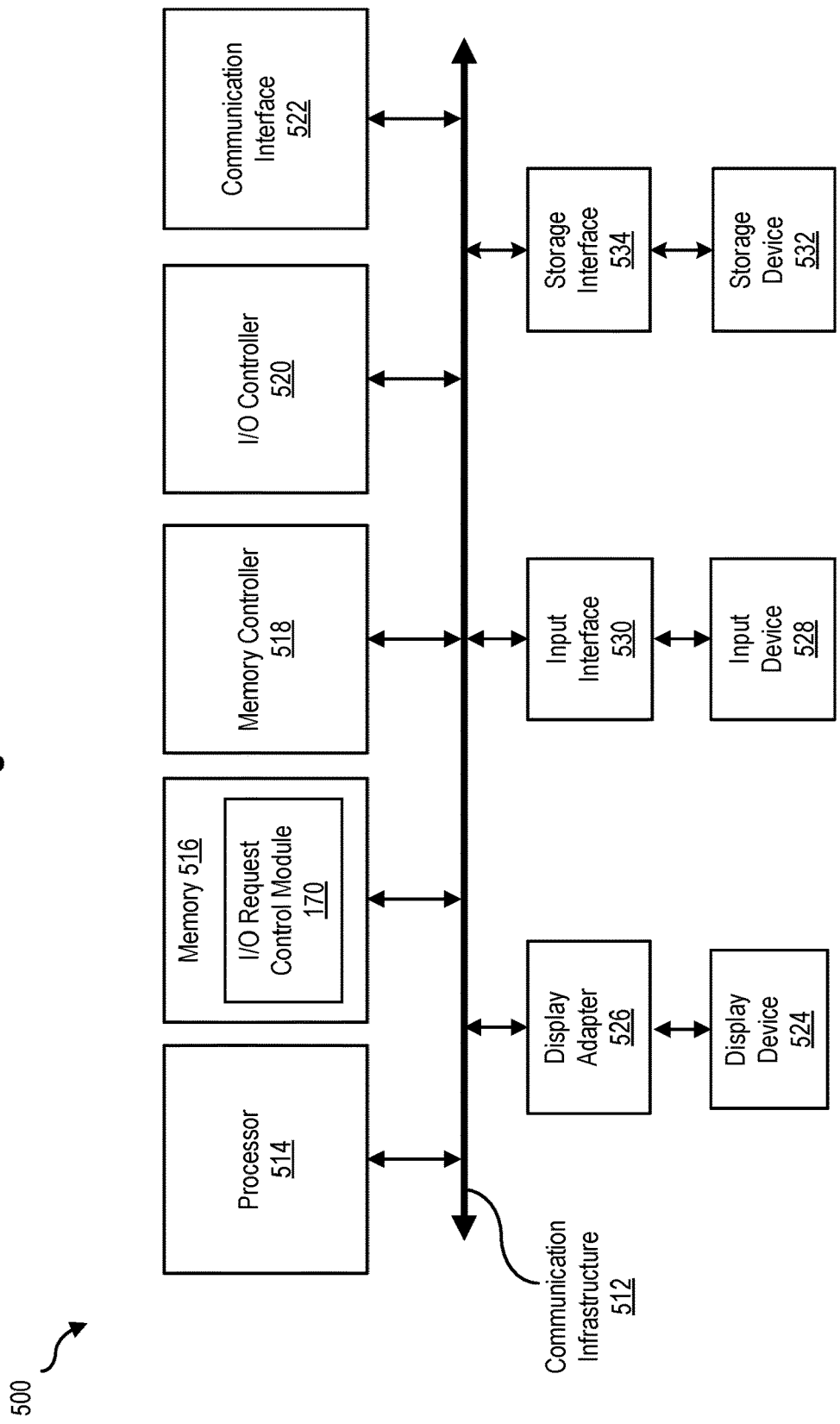
FIG. 5 is a block diagram of a computing device, illustrating how certain features of the instant disclosure can be implemented, according to one embodiment of the present disclosure.

FIG. 5 is a block diagram of a computing system 500 capable of performing one or more of the operations described above. Computing system 500 broadly represents any single or multi-processor computing device or system capable of executing computer-readable instructions. Examples of computing system 500 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 500 may include at least one processor 514 and a memory 516. By executing software that invokes, e.g., I/O request control module 170, or any modifications thereof consistent with this disclosure, computing system 500 becomes a special purpose computing device that is configured to perform operations in the manner described above.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing the operations described herein. Processor 514 may also perform and/or be a means for performing any other operations, methods, or processes described and/or illustrated herein.

Memory 516 generally represents any type or form of volatile or non-volatile storage devices or mediums capable of storing data and/or other computer-readable instructions. Examples include, without limitation, random access memory (RAM), read only memory (ROM), flash memory, a hard disk drive, or any other suitable memory device. Although not required, in certain embodiments computing system 500 may include both a volatile memory unit and a non-volatile storage device. In one example, program instructions implementing on or more operations described herein may be loaded into memory 510.

In certain embodiments, computing system 500 may also include one or more components or elements in addition to processor 514 and memory 516. For example, as illustrated in FIG. 5, computing system 500 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 500. For example, in certain embodiments memory controller 518 may control communication between processor 514, memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 500, such as processor 514, memory 516, communication interface 522, display adapter 526, input interface 530, and storage interface 534.

Communication interface 522 broadly represents any type or form of communication device or adapter capable of facilitating communication between computing system 500 and one or more additional devices. For example, in certain embodiments communication interface 522 may facilitate communication between computing system 500 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1894 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 500 to engage in distributed or remote computing. For example, communication interface 522 may receive instructions from a remote device or send instructions to a remote device for execution.

As illustrated in FIG. 5, computing system 500 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer) for display on display device 524.

As illustrated in FIG. 5, computing system 500 may also include at least one input device 528 coupled to communication infrastructure 512 via an input interface 530. Input device 528 generally represents any type or form of input device capable of providing input, either computer or human generated, to computing system 500. Examples of input device 528 include, without limitation, a keyboard, a pointing device, a speech recognition device, or any other input device.

As illustrated in FIG. 5, computing system 500 may also include a storage device 532 coupled to communication infrastructure 512 via a storage interface 534. Storage device 532 generally represents any type or form of storage device or medium capable of storing data and/or other computer-readable instructions. For example, storage device 532 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage device 532 and other components of computing system 500. A storage device like storage device 532 can store information such as the data structures described herein, as well as one or more computer-readable programming instructions that are capable of causing a computer system to execute one or more of the operations described herein.

In certain embodiments, storage device 532 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 532 may also include other similar structures or devices for allowing computer software, data, or other computer-readable instructions to be loaded into computing system 500. For example, storage device 532 may be configured to read and write software, data, or other computer-readable information. Storage devices 532 may also be a part of computing system 500 or may be a separate device accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from that shown in FIG. 5.

Computing system 500 may also employ any number of software, firmware, and/or hardware configurations. For example, one or more of the embodiments disclosed herein may be encoded as a computer program (also referred to as computer software, software applications, computer-readable instructions, or computer control logic) on a non-transient computer-readable storage medium. Examples of non-transient computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 500 for storage in memory via a network such as the Internet or upon a carrier medium.

The non-transient computer-readable storage medium containing the computer programming instructions may be loaded into computing system 500. All or a portion of the computer programming instructions stored on the non-transient computer-readable storage medium may then be stored in memory 516 and/or various portions of storage device 532. When executed by processor 514, a computer program loaded into computing system 500 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 500 may be configured as an application specific integrated circuit (ASIC) adapted to implement one or more of the embodiments disclosed herein.

FIG. 6 is a block diagram of a network architecture 600 in which client systems 610, 620, and 630, and servers 640 and 645 may be coupled to a network 650. Client systems 610, 620, and 630 generally represent any type or form of computing device or system, such as computing system 500 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, one or more of client systems 610, 620, and/or 630 may include software configured to execute, e.g., I/O request control module 170, and/or one or more components or threads thereof.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS). Such storage devices can store backup information and storage configuration information, as described above.

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 500 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 640(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of one of the systems in FIGS. 1A, 1B, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, one or more of the operations described herein may transform the behavior of a computer system such that the various operations described herein can be performed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining a first queue depth value;
   processing a first number of I/O requests during a first epoch, wherein the first number of I/O requests does not exceed the first queue depth value;
   evaluating the first queue depth value, wherein
     the evaluating the first queue depth value comprises
       determining a first latency value of a storage tier, wherein
         the first latency value indicates an amount of time that is needed to process an I/O request in the storage tier, and
       determining whether a system capacity increased during the first epoch, wherein
         the determining whether the system capacity increased during the first epoch is based, at least in part, on the first latency value; and
   in response to determining that the system capacity increased during the first epoch, dynamically determining a second queue depth value.

2. The method of claim 1, wherein
   the second queue depth value is determined by calculating a sum of the first queue depth value and a previous queue depth value, wherein
     the previous queue depth value is greater than or equal to zero.

3. The method of claim 1, further comprising
processing a second number of I/O requests during a second epoch, wherein
the second number of I/O does not exceed the second queue depth value;
evaluating the second queue depth value, wherein
the evaluating the second queue depth value comprises determining whether the system capacity increased during the second epoch; and
in response to determining that the system capacity increased during the second epoch, dynamically determining a third queue depth value.

4. The method of claim 3, wherein
the third queue depth value is determined by calculating a sum of the first queue depth value and the second queue depth value.

5. The method of claim 1, further comprising:
prior to the processing the first number of I/O requests, advertising the first queue depth value to one or more applications.

6. The method of claim 3, further comprising
processing a third number of I/O requests during a third epoch, wherein the third number of I/O does not exceed the third queue depth value;
evaluating the third queue depth value, wherein
the evaluating the third queue depth value comprises determining whether the system capacity increased during the third epoch; and
in response to determining that the system capacity did not increase during the second epoch, dynamically determining a fourth queue depth value, wherein the fourth queue depth value is less than the third queue depth value.

7. A system comprising:
a microprocessor; and
a non-transient computer-readable storage medium, comprising computer instructions executable by the microprocessor, wherein the computer instructions are configured to perform a method comprising the steps of:
determining a first queue depth value;
processing a first number of I/O requests during a first epoch, wherein
the first number of I/O requests does not exceed the first queue depth value;
evaluating the first queue depth value, wherein
the evaluating the first queue depth value comprises
determining a first latency value of a storage tier, wherein
the first latency value indicates an amount of time that is needed to process an I/O request in the storage tier, and
determining whether a system capacity increased during the first epoch, wherein
the determining whether the system capacity increased during the first epoch is based, at least in part, on the first latency value; and
in response to determining that the system capacity increased during the first epoch, dynamically determining a second queue depth value.

8. The method of claim 7, wherein
the second queue depth value is determined by calculating a sum of the first queue depth value and a previous queue depth value, wherein
the previous queue depth value is greater than or equal to zero.

9. The method of claim 7, further comprising
processing a second number of I/O requests during a second epoch, wherein
the second number of I/O does not exceed the second queue depth value;
evaluating the second queue depth value, wherein
the evaluating the second queue depth value comprises determining whether the system capacity increased during the second epoch; and
in response to determining that the system capacity increased during the second epoch, dynamically determining a third queue depth value.

10. The method of claim 7, further comprising:
prior to the processing the first number of I/O requests, advertising the first queue depth value to one or more applications.

11. The method of claim 9, wherein
the third queue depth value is determined by calculating a sum of the first queue depth value and the second queue depth value.

12. The method of claim 9, further comprising
processing a third number of I/O requests during a third epoch, wherein the third number of I/O does not exceed the third queue depth value;
evaluating the third queue depth value, wherein
the evaluating the third queue depth value comprises determining whether the system capacity increased during the third epoch; and
in response to determining that the system capacity did not increase during the second epoch, dynamically determining a fourth queue depth value, wherein the fourth queue depth value is less than the third queue depth value.

13. A computer program product, comprising a plurality of instructions stored on a non-transient computer-readable storage medium, wherein the instructions are configured to execute a method comprising the steps of:
determining a first queue depth value;
processing a first number of I/O requests during a first epoch, wherein the first number of I/O requests does not exceed the first queue depth value;
evaluating the first queue depth value, wherein
the evaluating the first queue depth value comprises
determining a first latency value of a storage tier, wherein
the first latency value indicates an amount of time that is needed to process an I/O request in the storage tier, and
determining whether a system capacity increased during the first epoch, wherein
the determining whether the system capacity increased during the first epoch is based, at least in part, on the first latency value; and
in response to determining that the system capacity increased during the first epoch, dynamically determining a second queue depth value.

14. The method of claim 13, wherein
the second queue depth value is determined by calculating a sum of the first queue depth value and a previous queue depth value, wherein
the previous queue depth value is greater than or equal to zero.

15. The method of claim 13, further comprising
processing a second number of I/O requests during a second epoch, wherein
the second number of I/O does not exceed the second queue depth value;

evaluating the second queue depth value, wherein
the evaluating the second queue depth value comprises determining whether the system capacity increased during the second epoch; and
in response to determining that the system capacity increased during the second epoch, dynamically determining a third queue depth value.

16. The method of claim 15, wherein
the third queue depth value is determined by calculating a sum of the first queue depth value and the second queue depth value.

17. The method of claim 15, further comprising
processing a third number of I/O requests during a third epoch, wherein the third number of I/O does not exceed the third queue depth value;
evaluating the third queue depth value, wherein
the evaluating the third queue depth value comprises determining whether the system capacity increased during the third epoch; and
in response to determining that the system capacity did not increase during the second epoch, dynamically determining a fourth queue depth value, wherein the fourth queue depth value is less than the third queue depth value.

* * * * *